(12) United States Patent
Ulmann

(10) Patent No.: US 10,843,641 B2
(45) Date of Patent: Nov. 24, 2020

(54) INSULATING ELEMENT

(71) Applicant: SIKA TECHNOLOGY AG, Baar (CH)

(72) Inventor: Stefan Ulmann, Zufikon (CH)

(73) Assignee: SIKA TECHNOLOGY AG, Baar (CH)

( * ) Notice: Subject to any disclaimer, the term of this patent is extended or adjusted under 35 U.S.C. 154(b) by 106 days.

(21) Appl. No.: 16/095,160

(22) PCT Filed: Apr. 21, 2017

(86) PCT No.: PCT/EP2017/059462
§ 371 (c)(1),
(2) Date: Oct. 19, 2018

(87) PCT Pub. No.: WO2017/182606
PCT Pub. Date: Oct. 26, 2017

(65) Prior Publication Data
US 2019/0126855 A1 May 2, 2019

(30) Foreign Application Priority Data
Apr. 22, 2016 (EP) ..................................... 16166719

(51) Int. Cl.
*B60R 13/08* (2006.01)
*B29C 44/18* (2006.01)
(Continued)

(52) U.S. Cl.
CPC ............ *B60R 13/08* (2013.01); *B29C 44/188* (2013.01); *B62D 25/00* (2013.01); *B62D 29/002* (2013.01);
(Continued)

(58) Field of Classification Search
CPC ...... B60R 13/08; B62D 29/002; B62D 25/00; B29C 44/188
(Continued)

(56) References Cited

U.S. PATENT DOCUMENTS 5,266,133 A 11/1993 Hanley et al.
5,373,027 A 12/1994 Hanley et al.
(Continued)

FOREIGN PATENT DOCUMENTS

DE 10148770 A1 4/2003
EP 0204970 B1 12/1990
(Continued)

OTHER PUBLICATIONS

Oct. 23, 2018 International Preliminary Report on Patentability issued in International Patent Application No. PCT/EP2017/059462.
(Continued)

*Primary Examiner* — Jason S Morrow
*Assistant Examiner* — E Turner Hicks
(74) *Attorney, Agent, or Firm* — Oliff PLC

(57) ABSTRACT

An insulating material for insulating a structural element in a vehicle including a support element with a first surface and a second surface, and an expandable material which is arranged on the support element. The expandable material is arranged here on a first sub-region of the first surface of the support element, and a second sub-region of the first surface is free from expandable material. The first sub-region is configured here in such a manner that the first surface of the support element is completely covered with expanded material after expansion of the expandable material.

13 Claims, 3 Drawing Sheets

(51) Int. Cl.
  *B62D 29/00* (2006.01)
  *B62D 25/00* (2006.01)
  *B29K 667/00* (2006.01)
  *B29K 675/00* (2006.01)
  *B29K 677/00* (2006.01)
  *B29K 705/00* (2006.01)
  *B29K 75/00* (2006.01)
  *B29K 105/00* (2006.01)
  *B29L 31/30* (2006.01)

(52) U.S. Cl.
  CPC .. *B29K 2075/00* (2013.01); *B29K 2105/0088* (2013.01); *B29K 2105/0094* (2013.01); *B29K 2667/00* (2013.01); *B29K 2675/00* (2013.01); *B29K 2677/00* (2013.01); *B29K 2705/00* (2013.01); *B29L 2031/30* (2013.01); *B29L 2031/3002* (2013.01)

(58) Field of Classification Search
  USPC ............... 296/187.02, 39.3, 39.1, 1.03, 1.06
  See application file for complete search history.

(56) References Cited

U.S. PATENT DOCUMENTS

| | | | | |
|---|---|---|---|---|
| 6,305,136 | B1* | 10/2001 | Hopton | B29C 44/18 296/146.6 |
| 6,387,470 | B1* | 5/2002 | Chang | B60R 13/08 428/121 |
| 7,097,794 | B2* | 8/2006 | McLeod | B29C 44/18 264/275 |
| 2006/0272884 | A1* | 12/2006 | Vilcek | B29C 44/18 181/198 |
| 2007/0138683 | A1* | 6/2007 | Kanie | B60R 13/08 264/51 |
| 2012/0285000 | A1* | 11/2012 | Leibman | B62D 33/048 29/527.1 |

FOREIGN PATENT DOCUMENTS

| | | |
|---|---|---|
| EP | 1591224 A1 | 11/2005 |
| GB | 2463858 A | 3/2010 |
| JP | 2006-001472 A | 1/2006 |
| JP | 2008-273035 A | 11/2008 |
| WO | 2005/080524 A1 | 9/2005 |
| WO | 2014/095620 A1 | 6/2014 |

OTHER PUBLICATIONS

Dec. 7, 2017 Search Report issued in International Patent Application No. PCT/EP2017/059462.

Apr. 6, 2020 Office Action issued in European Patent Application No. 17720057.3.

* cited by examiner

INSULATING ELEMENT

The invention relates to an insulating element having a carrier element and an expandable material, in particular for insulating a structural element having a cavity in a vehicle. Said invention furthermore relates to a system having a structural element and an insulating element disposed therein.

Construction elements such as, for example, bodies and/or chassis frames of transportation and conveyance means, in particular of aquatic or terrestrial vehicles or of aircraft, in many instances have structures having cavities in order for lightweight constructions to be enabled. These cavities however cause the most varied of problems. Depending on the type of the cavity, the latter has to be sealed in order to prevent the ingress of moisture and contaminations which can lead to corrosion of the construction elements. It is often also desirable for the cavities and thus the construction element to be substantially reinforced but for the low weight to be maintained. It is often also necessary for the cavities and thus the construction elements to be stabilized in order for noises which would otherwise be transmitted along the cavity or through the latter to be reduced. Many of these cavities have an irregular shape or tight dimensions, on account of which it becomes difficult to properly seal, reinforce, and insulate said cavities.

Baffle elements are therefore used in particular in the automotive industry but also in the aviation and nautical industry in order for cavities to be sealed and/or to be acoustically partitioned, or reinforcement elements are used in order for cavities to be reinforced.

FIG. 1 shows, schematically, a body of a motor vehicle. The body 10 herein has various structures having cavities such as, for example, pillars 14 and supports or stays 12, respectively. Such structural elements 12, 14 having cavities are usually sealed or reinforced, respectively, using sealing and/or reinforcement elements 16.

FIGS. 2a and 2b schematically show a known concept for the sealing and/or reinforcing closure of openings or cavities, respectively, in a motor vehicle. FIG. 2a herein shows an insulating element 16 prior to an expansion of an expandable material 13. FIG. 2b shows the same insulating element 16 but after an expansion of the expandable material 13, therefore with the expanded material 13'.

The insulating element 16 is located in a cavity of a body structure such as is illustrated in FIG. 1, for example. A portion of such a structural element 12, 14 of a body is schematically illustrated in FIGS. 2a and 2b. The insulating element 16 comprises a carrier element 11 which has a peripheral region 21. The expandable material 13 herein is disposed substantially on said peripheral region 21 of the carrier element 11.

A gap exists between the insulating element 16 and the structural element 12, 14 prior to the expansion of the expandable material 13. Said gap permits the structural element 12, 14 to be coated in order to achieve an anti-corrosion protection of the structural element 12, 14. The expandable material 13, after said coating, is usually expanded by way of a thermal influence, wherein the expanded material 13' on account thereof closes the gap between the insulating element 16 and the structural element 12, 14. Fixing of the insulating element 16' in the structural element 12, 14 is moreover also simultaneously achieved on account of the expansion of the expandable material 13. An insulating element 16' that is fastened in the structural element 12, 14 in such a manner reinforces the structural element 12, 14, on the one hand, and closes the cavity in the structural element 12, 14, on the other hand.

It is disadvantageous in such insulating elements 16 that the structural element 12, 14 in terms of acoustics cannot be insulated in an optimal manner therewith. The expanded material 13' as well as the carrier 11 are indeed capable of absorbing part of the acoustic waves. However, acoustic waves which propagate through the structural element 12, 14 can also partially propagate through the carrier 11.

The invention is therefore based on the object of providing an improved insulating element of the type explained above, in particular an insulating element having improved acoustic properties.

This object is achieved by an insulating element for insulating a structural element in a vehicle, said insulating element comprising a carrier element having a first surface and a second surface, and an expandable material which is disposed on the carrier element. The expandable material herein is disposed on a first part-region of the first surface of the carrier element, and a second part-region of the first surface is free of expandable material. The first surface of the carrier element herein is completely covered with expandable material after an expansion of the expandable material.

This solution has the advantage that a markedly improved acoustic insulation as compared to conventional insulating elements can be achieved on account thereof. In the case of the solution proposed here, acoustic waves can propagate to a lesser extent through the structural element because the expanded material completely covers a cross section of the structural element. All acoustic waves which propagate through the structural element are thus insulated by expanded material.

A core concept of the present invention lies in that as little as possible and as much as necessary expandable material is used in order to achieve a complete coverage of the carrier element after the expansion. This is achieved according to the invention in that part-regions which are free of expandable material as well as part-regions on which expandable material is disposed are disposed on the first surface of the carrier element. This apportionment of the first surface of the carrier element herein permits the most various patterns in the respective part-regions. It is essential herein that the entire first surface of the carrier element after the expansion is completely covered with expandable material.

The term "insulating element" in the context of this invention comprises elements for closing off and/or reinforcing and/or insulating a structural element. These various properties of such an insulating element herein can arise individually or in mutual combination.

The first surface and the second surface of the carrier element are disposed so as to be substantially mutually opposite.

The first surface and the second surface of the carrier element are configured as faces of an upper side and of a lower side of the carrier element.

The first surface and the second surface of the carrier element are exposed in substantially different directions.

The designation "first surface" in the context of this invention comprises only the actual surface of a first side of the carrier element and not faces across any potential clearances or similar provided in the carrier element.

In exemplary embodiments in which the first surface does not lie substantially in one plane, reference in the context of this invention is made to a projection of the first surface onto a plane. In these cases, apportionments of this first surface or ratios of this first surface in relation to a weight of the expandable material etc. thus apply in each case to the projection mentioned above. The same applies to the designation "second surface".

In one exemplary embodiment the first part-region is between 10 and 80% of the first surface. In one preferred refinement the first part-region is between 15 and 60% of the first surface, and in one further preferred refinement the first part-region is between 20 and 50% of the first surface.

In one alternative preferred refinement the first part-region is between 25 and 75% of the first surface, and in one further preferred alternative refinement the first part-region is between 35 and 70% of the first surface.

Such a percentage-wise apportionment of the surface into part-regions which are free of expandable material and part-regions which are covered with expandable material has the advantage that a complete coverage of the carrier surface of the first surface of the carrier element with expanded material can be achieved at an ideally minor input of expandable material.

Moreover, insulating elements having such a percentage-wise apportionment of the first surface into part-regions which are free of expandable material and part-regions which are covered with expandable material are producible in a cost-effective and efficient manner, because a conventional injection-molding method can be used herein.

In one exemplary embodiment a ratio of a mass of the expandable material to a size of the first surface is between 0.15 and 0.75 g/cm². In one preferred refinement this ratio is between 0.2 and 0.5 g/cm². In one further preferred refinement this ratio is between 0.25 and 0.35 g/cm². In one further preferred refinement this ratio is between 0.15 and 0.35 g/cm². In one further preferred refinement this ratio is between 0.15 and 0.25 g/cm².

Such an input of expandable material in relation to the size of the carrier element has the advantage that a complete coverage of the first surface of the carrier element after the expansion of the expandable material can in turn be achieved by way of ideally little expandable material. A suitable mass of expandable material per unit area can be chosen here, depending on the expansion capability of the expandable material.

In one exemplary embodiment the expandable material has an expansion rate of 300 to 3000%. In one advantageous refinement the expansion rate of the expandable material is between 1000 and 2700%. In one further advantageous refinement the expansion rate of the expandable material is between 1500 and 2500%.

The choice of such an expansion rate has the advantage that it is ensured on account thereof that the second part-regions which are free of expandable material are completely covered with expandable material after the expansion of the expandable material.

In one exemplary embodiment a width of the carrier element is more than 50 mm, and a length of the carrier element is likewise more than 50 mm. In one refinement, the length and the width of the carrier element are more than 60 mm, 70 mm, or 80 mm.

In the case of carrier elements of irregular shape the width in the context of this invention is measured at a greatest location in terms of an extent of the width of the carrier element, and the length is likewise measured at a greatest location in terms of an extent of the length of the carrier element.

In one exemplary embodiment the first part-region of the first surface of the first carrier element forms a contiguous pattern.

Providing such a contiguous pattern has the advantage that, on account thereof, the expandable material can be applied to the carrier element in a more cost-effective manner in the production of the insulating element. In the case of a contiguous pattern, the expandable material can be brought onto the envisaged locations from only one application opening, for example.

In one exemplary refinement the pattern has strip-shaped elements.

Such strip-shaped elements have the advantage that, on account thereof, an efficient coverage of the surface of the carrier element can be achieved, because the surface of the carrier element can be divided into many small second part-regions which are free of expandable material by way of such strip-shaped elements. Such small second part-regions of the first surface herein are more easy to bridge than comparatively large second part-regions by way of the expansion of the expandable material.

In one exemplary refinement a first strip-shaped element is disposed along a circumference of the first surface of the carrier element.

Such an arrangement of a first strip-shaped element around the carrier element (also referred to as a "race track") has the advantage that, on account thereof, the gap between the insulating element and the structural element can be closed in a reliable and efficient manner when the expandable material expands.

In one exemplary refinement a second strip-shaped element extends transversely across an internal region of the first surface of the first carrier element.

Such a second strip-shaped element has the advantage that, on account thereof, the internal region of the first surface which in principle is free of expandable material, can be divided into smaller second part-regions which in turn can be more readily bridged by way of the expansion of the expandable material. It goes without saying that, depending on the size of the carrier element, a plurality of such second strip-shaped elements can also be disposed transversely across the internal region of the first surface of the carrier element.

In one exemplary refinement the second strip-shaped element has a rectangular or V-shaped or semi-circular cross section.

The choice of a suitable cross section of the second strip-shaped element has the advantage that, on account thereof, a direction of expansion of the expandable material can be controlled or optimized, respectively. The choice of a suitable cross section herein can be made depending on the geometry of the carrier element.

In one exemplary refinement the second strip-shaped element is disposed in a depression of the carrier element.

Providing such a depression in the carrier element has the advantage that, on account thereof, the production of the insulating element is simplified in that, for example, the expandable material can be cast in said depressions, and the insulating elements prior to the expansion are rendered more robust and more readily manageable in that the expandable material is disposed so as to be protected in the depressions of the carrier element, on the other hand.

In one exemplary embodiment the first part-region of the first surface of the carrier element which is covered with expandable material is composed of a plurality of non-contiguous elements.

Providing a plurality of such non-contiguous elements has the advantage that, on account thereof, a pattern of the first part-region on the first surface of the carrier element can be more freely chosen. On account thereof, the expandable material can be disposed on the surface of the carrier element in a strategically ideal manner. For example, the expandable material herein can be disposed on the surface such that the second part-regions which are free of expandable material do not exceed a specific dimension such as, for example, a specific width between two neighboring elements of the first part-region.

In one exemplary embodiment the non-contiguous expandable materials which are in each case disposed on the non-contiguous parts of the first part-region are composed of the same expandable material.

In one exemplary embodiment the insulating element has two non-contiguous expandable materials which are composed of the same material.

In one further exemplary embodiment the insulating element has three or more non-contiguous expandable materials, wherein at least two of said non-contiguous expandable materials are composed of the same material.

In one exemplary refinement a first element is disposed in a strip-shaped manner along the circumference of the first surface of the carrier element, wherein one or a plurality of further elements is/are disposed in the internal region of the first surface of the carrier element.

Providing a strip-shaped encircling element has the advantage that, on account thereof, the gap between the insulating element and the structural element can be closed in an efficient and reliable manner when the expandable material expands. Providing the further elements in the internal region of the first surface has the advantage that, on account thereof, the second part-regions which are free of expandable material do not exceed a specific extent. This permits a reliable complete coverage with expandable material at a simultaneously ideal minor input of expandable material.

In one exemplary refinement the further elements are interconnected.

Interconnecting said further elements has the advantage that, on account thereof, the production of the insulating elements can be simplified or rendered cheaper, respectively. For example, in the application of the expandable material to the carrier interconnected further elements can be applied by way of only one application opening for the expandable material.

In one exemplary embodiment the elements are distributed in a regular pattern across the first surface.

Such a regular pattern has the advantage that the second part-regions are designed identically across the entire surface and therein do not exceed a specific extent, on the one hand, and such regular patterns have the advantage that simple tools for said regular patterns can be used for the production of the insulating element, on the other hand.

A system having a structural element and an insulating element according to the description above disposed therein is furthermore proposed.

Details and advantages of the invention are described in the following text on the basis of exemplary embodiments and with reference to schematic drawings, in which.

Figure 1:
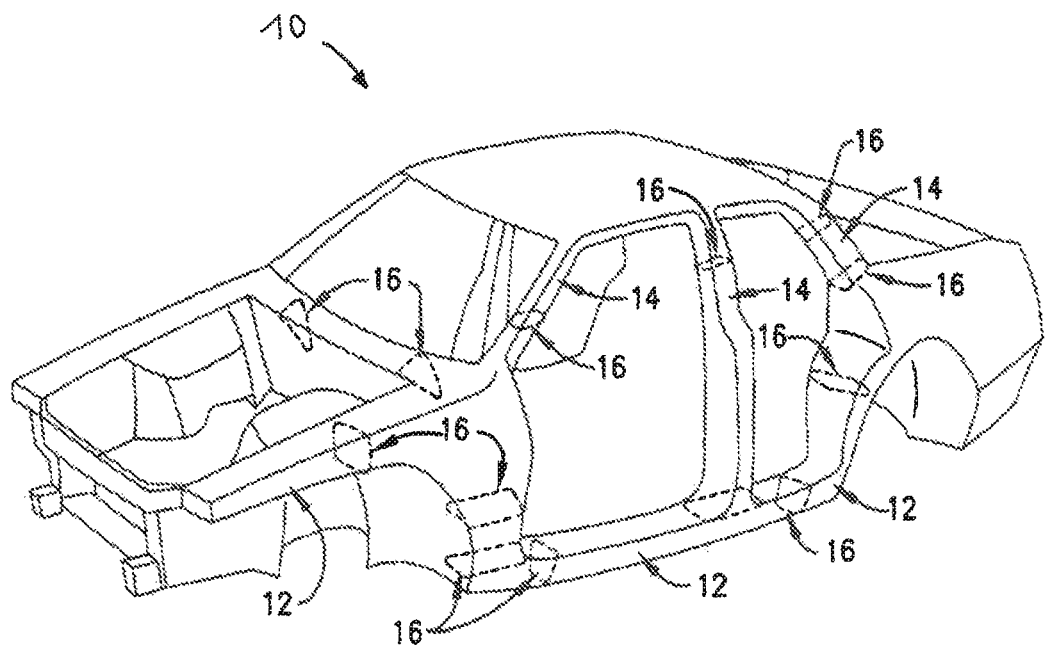
FIG. 1 shows an exemplary illustration of a body according to the prior art.
Figure 2A:
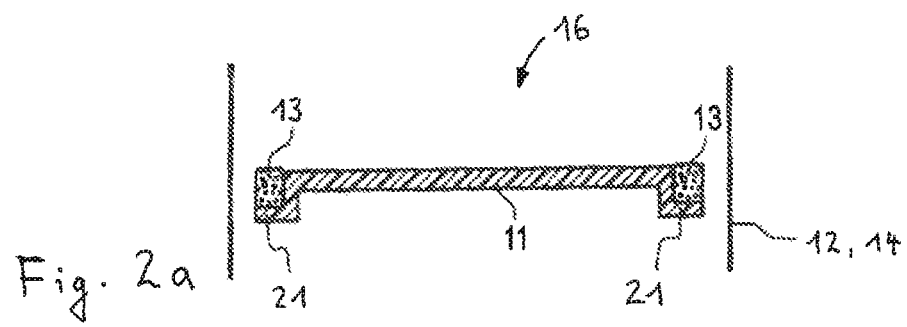
FIGS. 2a and 2b show schematic illustrations for explaining an exemplary insulating element according to the prior art.
Figure 2B:
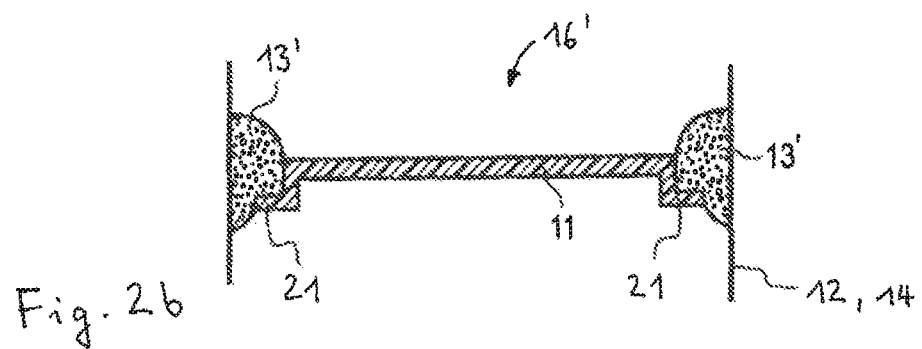

In FIGS. 3a to 3h in each case a plan view of an exemplary insulating element 16 is illustrated such that only the first surface of the carrier element 11 is visible. Said first surface of the carrier element 11 herein comprises a first part-region 18 on which expandable material is disposed, and a second part-region 19 which is free of expandable material. The first part-region 18 and the second part-region 19 herein can form one contiguous face or else a plurality of non-contiguous faces. In all exemplary embodiments according to FIGS. 3a to 3h the first-part region 18 and the second part-region 19 are in each case disposed such that after an expansion of the expandable material the first surface of the carrier element 11 is completely covered with expandable material. This is achieved in particular in that the second part-regions, or the second part-region, respectively, does not exceed specific critical dimensions. For example, the second part-region 19, or the second part-regions 19, respectively, can be chosen in such a manner that a width of said second part-regions 19, or of said second part-region 19, respectively, does not exceed a specific dimension. The expandable material which is disposed on the adjacent first part-regions 18 can thus bridge the second part-regions 19 when expanded.

There are various design embodiments of the part-regions 18, 19 in the embodiments illustrated in an exemplary manner. On the one hand, the first part-region 18 can be configured as a contiguous pattern, for example, as is the case in FIGS. 3a, 3b, and 3c. In other exemplary embodiments the first part-region 18 is composed of a plurality of non-contiguous elements, as is illustrated in FIGS. 3d to 3h.

Figure 3A:
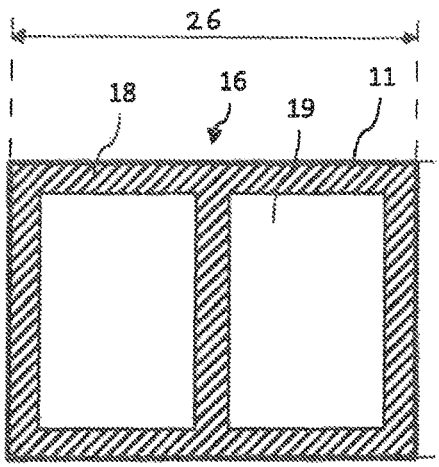
FIGS. 3a to 3h show schematic illustrations of a first surface of the carrier element having a first and a second part-region.
Figure 3B:
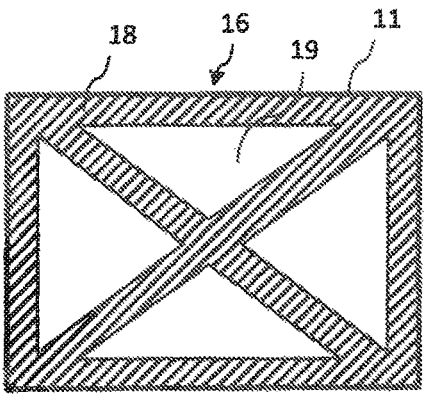
Figure 3C:
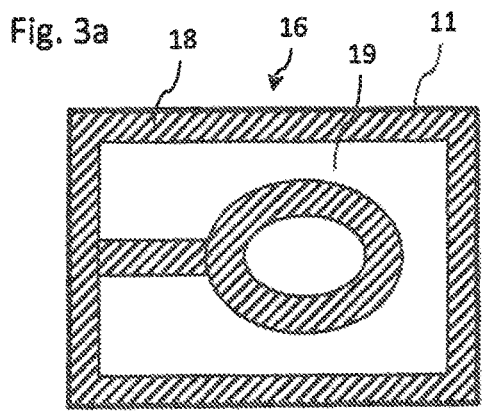

Furthermore, the first part-region 18 can have one or a plurality of strip-shaped elements. This is depicted in an exemplary manner in FIGS. 3a, 3b, 3c, 3d, 3e, and 3g. A first strip-shaped element herein can be disposed along the circumference of the first surface of the carrier element 11, as is shown in FIGS. 3a to 3e. However, the first part-region 18 can also be disposed on the carrier element 11 in another manner, as is depicted in FIGS. 3f and 3h.

In some exemplary embodiments the first part-region 18 is distributed as a regular pattern across the first surface of the carrier element 11. This is the case in images 3f to 3h.

As can be seen from the exemplary embodiments illustrated, the most varied of arrangements of the first part-region 18 and of the second part-region 19 on the first surface of the carrier element 11 are possible. It is essential herein that after an expansion of the expandable material which is disposed on the first part-region 18, the first surface of the carrier element 11 is completely covered with expandable material.

The carrier element 11 of the insulating material 16 herein has a width 27 and a length 26. Both the width 27 as well as the length 26 of the carrier element are more than 50 mm in the exemplary embodiments according to FIGS. 3a to 3h.

Figure 3D:
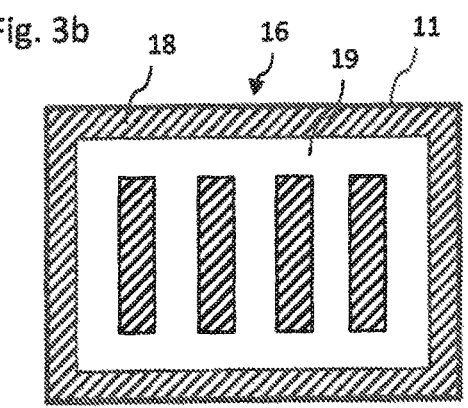
Figure 3E:
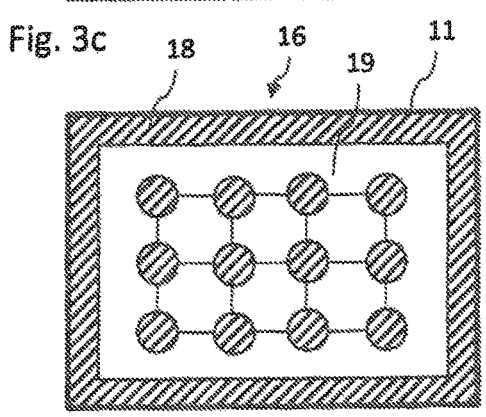
Figure 3F:
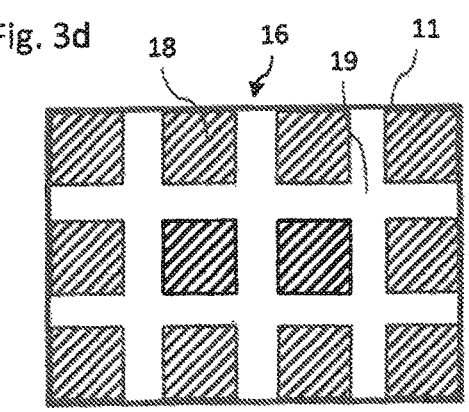
Figure 3G:
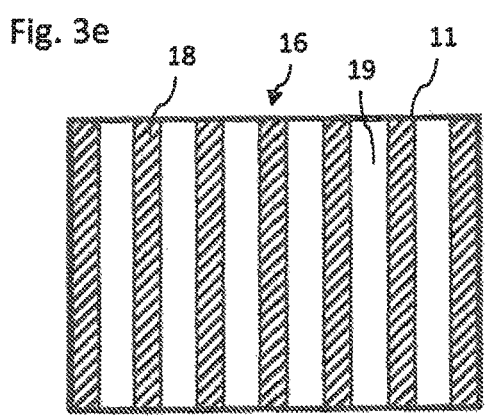
Figure 3H:
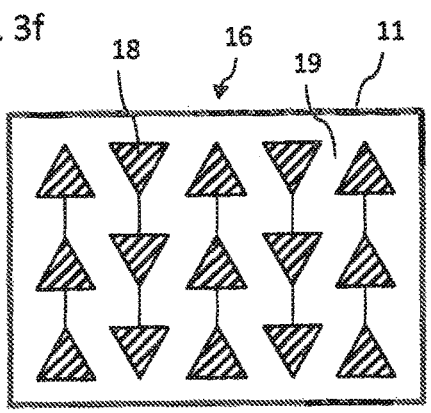
Figure 4A:
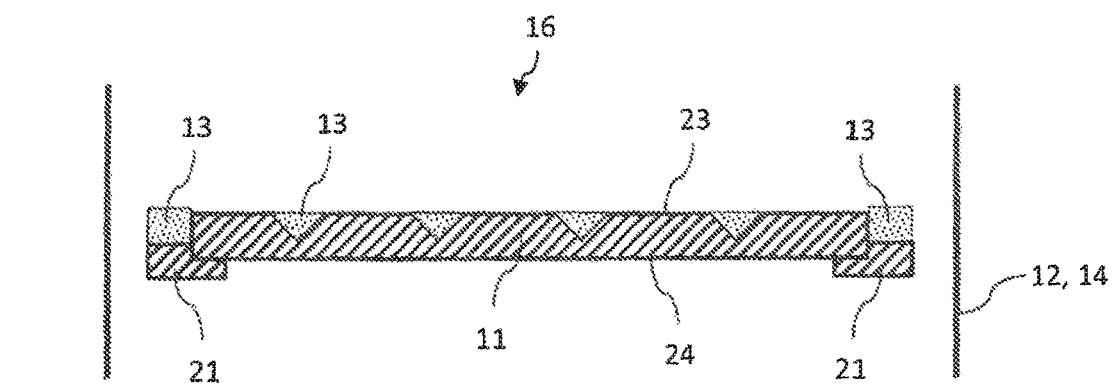
FIGS. 4a and 4b show schematic illustrations of an exemplary insulating element in a structural element.
Figure 4B:
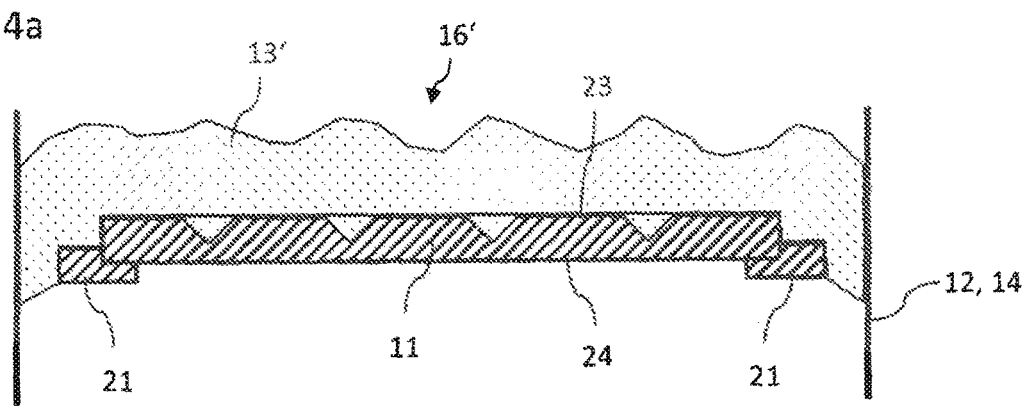

A cross section of the insulating element 16 from FIG. 3d is illustrated in FIGS. 4a and 4b. FIG. 4a herein shows the insulating element 16 prior to an expansion of the expandable material 13, and FIG. 4b shows an insulating element 16' after expansion of the expandable material 13, thus the expanded material 13'.

In the exemplary embodiment according to FIGS. 4a and 4b the carrier element 11 has a peripheral region 21 which is designed so as to be slightly offset in relation to an internal region of the carrier 11. The peripheral region 21 herein can be configured so as to be integral to the carrier element 11 (not illustrated) or so as not to be integral, as is illustrated in FIGS. 4a and 4b. The expandable material 13 is disposed in a strip-shaped manner on said peripheral region 21, wherein said expandable material 13 is disposed along a circumference of the first surface 23 of the carrier element 11. Moreover, on the carrier element 11 further strip-shaped elements of expandable material 13 are disposed on first part-regions of the first surface 23 of the carrier element 11. Said further strip-shaped elements in this exemplary embodiment are disposed in depressions of the carrier element 11. The further strip-shaped elements herein have a V-shaped cross section.

The insulating element 16' in the structural element 12, 14 is illustrated after expansion in FIG. 4b. It can be seen herein that the expanded material 13' completely covers the first surface 23 of the carrier element 11. Moreover, the expanded material 13' bridges the gap, which existed prior to the expansion, between the insulating element 16 and the structural element 12, 14. On account thereof, the insulating element 16' is locally fastened in the structural element 12, 14. On account of the complete coverage of the first surface 23 of the carrier element 11, the entire cross section of the structural element 12, 14 is filled with expanded material 13'. An improved acoustic insulating performance of the insulating element 16 is achieved on account thereof.

Figure 5A:
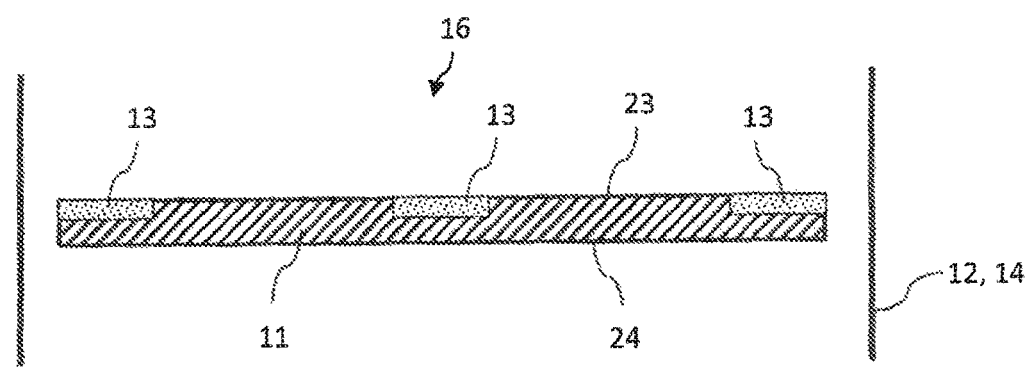
FIGS. 5a and 5b show schematic illustrations of an exemplary insulating element in a structural element.
Figure 5B:
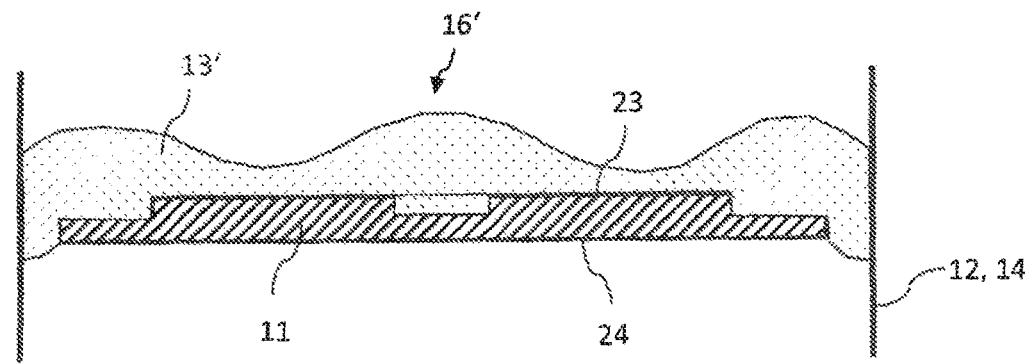

A further exemplary embodiment of an insulating element 16 in a structural element 12, 14 is illustrated prior to and after expansion of the expandable material 13 in FIGS. 5a and 5b. The carrier element 11 again has a first surface 23 and a second surface 24. There are first part-regions which are covered with expandable material 13 on the first surface 23. Moreover, there are second part-regions which are free of expandable material 13. The carrier 11 in this exemplary embodiment does not have any offset peripheral regions 21. The insulating element 16 illustrated here corresponds to the insulating element 16 that is shown in a plan view in FIG. 3a. In a manner similar to the insulating element 16 in FIGS. 4a and 4b, the first part-region is disposed here too by way of a first strip-shaped element along a circumference of the first surface of the carrier element 11. Moreover, there is a second strip-shaped element which is disposed transversely across an internal region of the first surface 23 of the carrier element 11.

After the expansion of the expandable material 13, the first surface 23 of the carrier element 11 is completely covered with expandable material 13'. Again, a gap between the insulating element 16 and the structural element 12, 14 is closed by expanded material 13'. The expanded material 13' also in this exemplary embodiment thus completely covers a cross section of the structural element 12, 14, on account of which improved acoustic insulation properties result.

Expandable Materials (Capable of Foaming)

In principle, any arbitrary material that can be made to foam in a controlled manner can be used as the expandable material. Said material herein may or may not have reinforcing properties. The material capable of foaming is typically foamed in a thermal manner, by moisture, or by electromagnetic radiation.

Such an expandable material typically has a chemical or physical propellant. Chemical propellants are organic or inorganic compounds which decompose under the influence of temperature, moisture, or electromagnetic radiation, wherein at least one of the decomposition products is a gas. Compounds which transition into the gaseous aggregate state when the temperature is increased can be used as physical propellants, for example. On account thereof, both chemical as well as physical propellants are capable of generating foam structures in polymers.

The expandable material is preferably foamed in a thermal manner, wherein chemical propellants are used. Azodicarbonamides, sulfo hydrazides, hydrogen carbonates, or carbonates are suitable as chemical propellants, for example.

For example, suitable propellants are also commercially available under the Expancel® brand from Akzo Nobel, Netherlands, or under the Celogen® brand from Chemtura Corp., USA.

The heat required for foaming can be introduced by way of external or by way of internal heat sources such as an exothermal chemical reaction. The material capable of foaming is preferably capable of being foamed at a temperature of 200° C., in particular of 140° C. to 190° C., preferably of 160° C. to 180° C.

Single-component epoxy resin systems which are not free-flowing at room temperature and in particular have an enhanced impact resistance and contain thixotropy agents such as aerosols or nanoclays are suitable as expandable materials, for example. For example, epoxy resin systems of this type comprise 20 to 50% by weight of a liquid epoxy resin, 0 to 30% by weight of a solid epoxy resin, 5 to 30% by weight of viscosity modifiers, 1 to 5% by weight of physical or chemical propellants, 10 to 40% by weight of fillers, 1 to 10% by weight of thixotropy agents, and 2 to 10% by weight of heat-activatable curing agents. Reactive liquid rubbers based on nitrile rubber, or derivates of polyether polyol polyurethanes, core shell polymers, and similar systems known to a person skilled in the art are suitable as viscosity modifiers.

Single-component polyurethane compositions, constructed from crystalline polyesters comprising OH groups mixed with further polyols, preferably polyether polyols, and polyisocyanates with blocking isocyanate groups, that include propellants are likewise suitable expandable materials. The melting point of the crystalline polyester should be ≥50° C. The isocyanate groups of the polyisocyanate can be blocked by nucleophiles such as caprolactam, phenols, or benzoxalones, for example. Blocked polysiocyanates such as are used, for example, in powder-coating technology and are commercially available from Degussa GmbH, Germany, for example under the Vestagon® BF 1350 and Vestagon® BF 1540 brands are furthermore suitable. So-called encapsulated or surface-deactivated polyisocyanates which are known to a person skilled in the art and are described, for example, in EP 0 204 970 are likewise as isocyanates.

Two-component epoxy/polyurethane compositions containing propellants such as are described, for example, in WO 2005/080524 A1 are furthermore suitable as expandable materials.

Ethylene vinyl acetate compositions containing propellants are furthermore suitable as expandable materials.

Expandable materials that are likewise suitable are marketed by Sika Corp., USA under the SikaBaffle® 240, SikaBaffle® 250 or SikaBaffle® 255 brand and are described in the U.S. Pat. Nos. 5,266,133 and 5,373,027.

Furthermore suitable expandable materials are marketed by Sika under the SikaBaffle®-450, SikaBaffle®-420, SikaBaffle®-250NT, SikaBaffle®-255 and SikaBaffle®-250PB2 brands. Such expandable materials have an expansion rate of approximately 300 to 3000% and are particularly preferable for the present invention.

In particular SikaBaffle®-450, having an expansion rate of more than 1200%, is suitable for the purposes of the present invention, because the second part-region of the first surface in the expansion of the expandable material is reliably covered on account of a high expansion rate.

In one concrete preferred exemplary embodiment, an arrangement of the expandable material on the carrier element according to FIG. 3a is embodied at a ratio of a mass of the expandable material to a size of the first surface of approximately 2.5 g/cm². The expandable material herein under the influence of heat at 180° C. over 30 min has an expansion rate of approximately 2000%. On account thereof, a complete coverage of the first surface with expanded material can be achieved, the described advantages of the invention in terms of acoustic insulation resulting therefrom.

For example, expandable materials having reinforcing properties which are marketed under the brand SikaReinforcer® 941 by Sika Corp., USA, are preferred as expandable materials having reinforcing properties. The latter are described in U.S. Pat. No. 6,387,470.

Carrier Material

The carrier material can be composed of arbitrary materials. Preferred materials are plastics materials, in particular polyurethanes, polyamides, polyesters, and polyolefins, preferably high-temperature-resistant polymers such as poly (phenylene ether), polysulfones, or polyether sulfones, which are in particular also foamed; metals, in particular aluminum and steel; or grown organic materials, in particular wood or other (densified) fibrous materials, or glass-type or ceramic materials; especially also foamed materials of this type; or arbitrary combinations of said materials. Polyamide, in particular polyamide 6, polyamide 6.6, polyamide 11, polyamide 12, or a mixture thereof, is particularly preferably used. Combinations with fibers such as, for example, glass fibers or carbon fibers, are also possible.

The carrier element can furthermore have an arbitrary construction and an arbitrary structure. Said carrier element can be for example solid, hollow, or foamed, or have a grid structure. The surface of the carrier element can typically be smooth, rough, or structured.

In the case of sealing and reinforcement elements according to the invention in which the expandable material is located on a carrier element, the production method differs according to whether the carrier element is or is not composed of a material that is capable of being processed by injection molding. In the affirmative, a two-component injection molding method is usually used. Herein a first component, in this case the carrier element, is injected first. After the solidification of said first component, the cavity in the tool is enlarged or adapted, respectively, or the injection-molded product is laid up in a new tool, and the first component is overmolded with a second component, in this case the expandable material, by way of a second injection apparatus.

If the carrier element is composed of a material which cannot be produced by the injection molding method, thus from a metal, for example, the carrier element is laid up in a respective tool and the carrier element is overmolded with the expandable material. There is of course also the possibility for the expandable material to be fastened to the carrier element by way of special fastening means or methods.

The invention claimed is:

1. An insulating element for insulating a structural element in a vehicle, said insulating element comprising:
a carrier element having a first surface and a second surface;
and an expandable material which is disposed on the carrier element;
wherein:
(i) the first surface of the carrier element includes a first part-region that is defined where the expandable material is disposed on the first surface and a second part-region that is free of expandable material,
(ii) the first-part region is composed of a plurality of non-contiguous elements including (a) a first element that is disposed in a strip-shaped manner along the circumference of the first surface, and (b) a plurality of further elements that are disposed in an internal region of the first surface, are interconnected prior to the expansion of the expandable material, and are non-contiguous with the first element, and
(iii) the insulating element is configured so that the first surface of the carrier element is completely covered by expandable material after an expansion of the expandable material.

2. The insulating element as claimed in claim 1, wherein the first part-region is between 10 and 80% of the first surface.

3. The insulating element as claimed in claim 1, wherein a ratio of a mass of the expandable material to a size of the first surface is between 0.15 and 0.75 g/cm².

4. The insulating element as claimed in claim 1, wherein a width of the carrier element is more than 50 mm, and wherein a length of the carrier element is likewise more than 50 mm.

5. The insulating element as claimed in claim 1, wherein the plurality of further elements forms a pattern that has strip-shaped elements.

6. The insulating element as claimed in claim 1, wherein the plurality of further elements includes a second strip-shaped element that extends transversely across the internal region.

7. The insulating element as claimed in claim 6, wherein the second strip-shaped element has a rectangular or V-shaped or semi-circular cross section.

8. The insulating element as claimed in claim 6, wherein the second strip-shaped element is disposed in a depression of the carrier element.

9. The insulating element as claimed in claim 1, wherein the plurality of further elements are distributed in a regular pattern across the first surface.

10. A system having a structural element and an insulating element as claimed in claim 1 disposed therein.

11. The insulating element as claimed in claim 1, wherein the first element surrounds the plurality of further elements.

12. The insulating element as claimed in claim 1, wherein the first element extends along an entire circumference of the first surface.

13. The insulating element as claimed in claim 1, wherein the expandable material has an expansion rate of 300 to 3000%.

* * * * *